United States Patent [19]

Chen

[11] Patent Number: 5,764,755
[45] Date of Patent: Jun. 9, 1998

[54] RING-SIGNAL GENERATION IN A SLIC

[75] Inventor: Herbert M. K. Chen, Austin, Tex.

[73] Assignee: Advanced Micro Devices, Inc., Sunnyvale, Calif.

[21] Appl. No.: 808,605

[22] Filed: Feb. 28, 1997

Related U.S. Application Data

[63] Continuation of Ser. No. 384,339, Feb. 1, 1995, abandoned.

[51] Int. Cl.$^6$ .................. H04M 11/00; H04M 3/00; H04M 1/00
[52] U.S. Cl. .................. 379/399; 379/67; 379/88; 379/89; 379/253; 379/254; 379/324; 379/377; 379/385; 379/399
[58] Field of Search .................. 379/67, 88, 89, 379/399, 418, 377, 385, 324, 253, 254

[56] References Cited

U.S. PATENT DOCUMENTS

| | | | |
|---|---|---|---|
| 4,349,703 | 9/1982 | Chea, Jr. | 379/67 |
| 4,431,868 | 2/1984 | Bolus et al. | 379/373 |
| 4,903,189 | 2/1990 | Ngo et al. | 363/127 |
| 5,111,382 | 5/1992 | Jones et al. | 363/132 |
| 5,138,658 | 8/1992 | Carter et al. | 379/413 |
| 5,461,670 | 10/1995 | Consiglio et al. | 379/387 |

FOREIGN PATENT DOCUMENTS

WO 93/20645  10/1993  WIPO .

OTHER PUBLICATIONS

Goodenough, "High–Voltage Bonded–Wafer ICs Create First SLIC to Switch the 93–V RMS Phone–Line Ring Voltage On–Chip, Eliminating PABX Relays, SLIC Ejects Relays from PABX Line Cards," 2328 *Electronic Design*, 42 (1994) Jul. 11, No. 14, pp. 55–56 and 58–59 and 62–64.

*Primary Examiner*—Harry S. Hong
*Assistant Examiner*—Allan Hoosian
*Attorney, Agent, or Firm*—Foley & Lardner

[57] ABSTRACT

A ring generator circuit is included in a subscriber line interface circuit (SLIC) for providing a high voltage ring signal to a plurality of ringers at the same time. The ring generator circuit includes an adder and divider circuit connected to receive a DC offset and an AC reference signal from the SLIC. The adder and divider circuit outputs a fractionalized summed signal. That signal is supplied to a full-wave rectifier, which rectifies the fractionalized summed signal so that it is always a positive voltage. The rectified signal is supplied to a switch control circuit, a first amplifier and a second amplifier. The first and second amplifiers have the same gain, but with opposite signs or polarities. The outputs of the first and second amplifiers are sent to a commutating switch, which is controlled by an output of the switch control circuit. The output of the switch control circuit is used to force the commutating switch to output a ring signal that has either a same or a reversed polarity with respect to the summed signal.

19 Claims, 9 Drawing Sheets

RING-SIGNAL GENERATION IN A SLIC

This application is a continuation, of application Ser. No. 08/384,339, filed Feb. 1, 1995, now abandoned.

BACKGROUND OF THE INVENTION

1. Field of the Invention

This invention relates to a ring signal generation circuit that provides on-chip ring generation on a subscriber line interface circuit (SLIC). More specifically, this invention relates to the modification of the internal DC loop of a SLIC to generate a high voltage ring signal.

2. Description of the Related Art

Conventional ring generator circuits are typically large units located in a central telephone switching office (central office). In such installations, one ring generator circuit must drive many telephone lines at the same time. A line for each of the telephones is connected to the central office where the ring generator is located. Often, the telephone traffic results in a number of telephones ringing at the same time. Therefore, the ring generator circuit must be designed to drive many lines and ring many telephones simultaneously. The exact requirements of such ring generator circuits are based on traffic statistics of the number and frequency of telephone calls received in an office.

Figure 1:
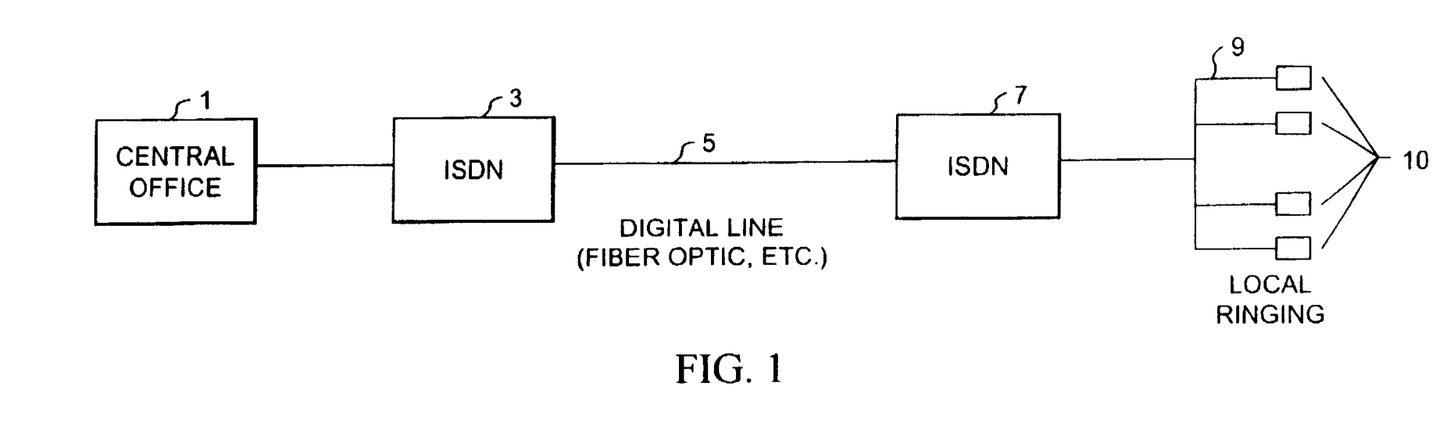
FIG. 1 shows a telephone system in which the central office is connected in an ISDN network, for example through non-metallic transmission media.

Increasing numbers of telephone users and the development of alternative communication and transmission techniques, such as fiber optic communications, have created new problems and requirements for ring generator circuits. For example, FIG. 1 shows a system in which the central office 1 sends information through an ISDN network 3 over a digital line 5. That information is received by an ISDN network 7, in which telephones 10 connected to local lines 9 are individually or simultaneously rung. This system is in contrast to a more traditional system shown in FIG. 2, in which central office 1 rings each of the lines 9 individually or simultaneously.

Figure 2:
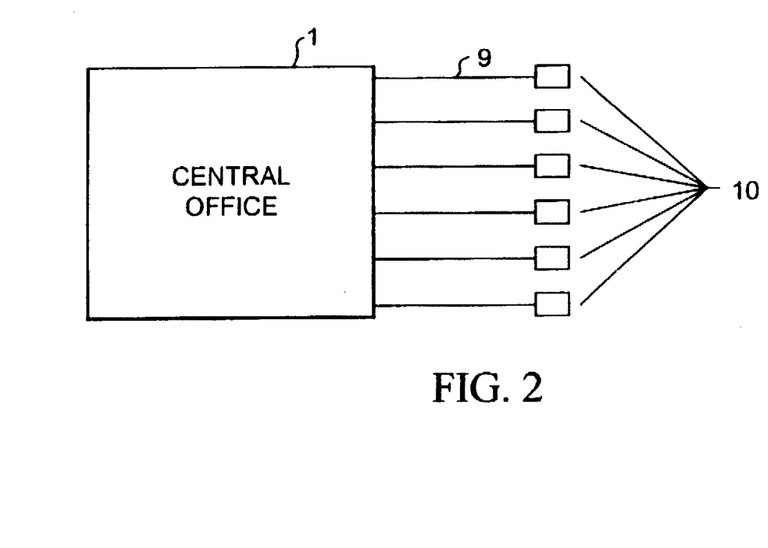
FIG. 2 shows a traditional telephone system in which the central office rings each of the lines individually.

Referring back to FIG. 1, in the case where digital line 5 is, for example, a fiber optic line, the line cannot carry the high power ring signal used in the traditional systems of FIG. 2. In the United States, such ring signals are specified at a DC level of −48 volts with an AC signal of 86 volts RMS. In view of the characteristics of the transmission media, such as the limitations of fiber optic cables, the need to provide local ring generators has become critical.

Figure 3:
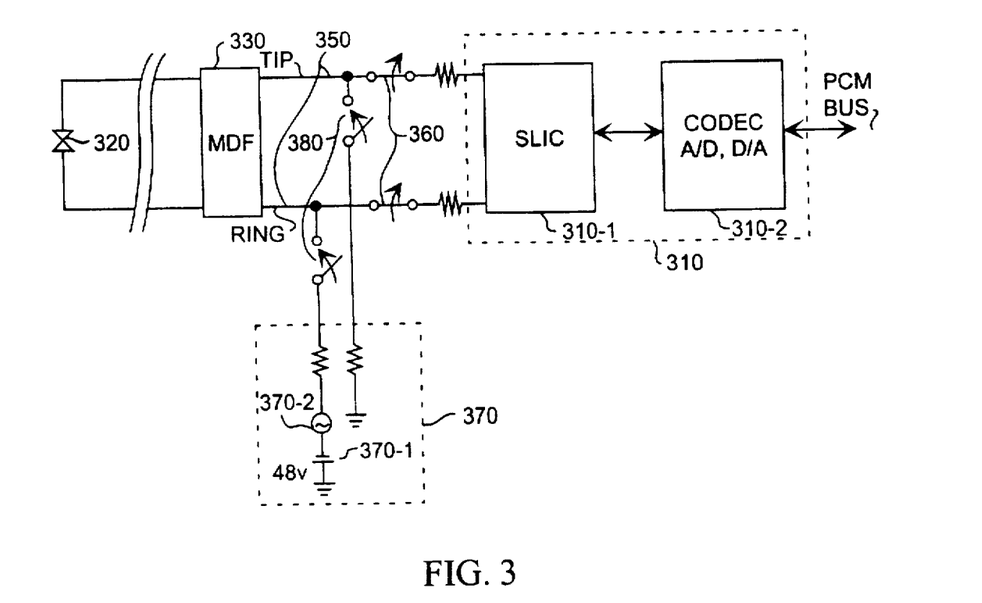
FIG. 3 shows a conventional hookup of a SLIC with a centralized ring generator.

Referring now to FIG. 3, a conventional office ring generation system which uses a SLIC such as the 79M573, manufactured by Advanced Micro Devices, will be described in more detail. A line card 310, which includes a SLIC 310-1 and a CODEC (coder/decoder) 310-2, are connected on one end to a pulse code modulation (PCM) bus, then to a switch (not shown), and then to a four-wire telephone system (not shown) or the like. The SLIC 310-1 is connected on another end to a pair of telephone lines 350 (two-wire system), where these wires are respectively known as the tip and ring line. The SLIC 310-1 connects to the telephone sets 320 through a main distribution frame (MDF) 330 and the local loop. The connection of the SLIC 310-1 to the dual telephone lines 350 is through a pair of normally-closed switches 360.

The SLIC 310-1 is used to couple the telephone sets 320 (subscriber terminal) with an exchange (not shown in FIG. 3). The exchange is usually a digital exchange, and the coupling between the SLIC 310-1 and the exchange normally involves pulse code modulation (pcm), where the signals pass through the CODEC 310-2 to the switch. The SLIC 310-1 handles battery feed or current feed responsibilities, supervisory functions and hybrid functions. Part of the supervisory functions involve supplying a DC current to the telephone sets 320 coupled to the telephone lines (or subscriber lines) 350, and monitoring whether the telephone sets 320 are either on-hook or off-hook. The battery feed function supplies DC current to the telephone sets 320 to allow for telephone communication. The hybrid function performs the two-wire to four-wire, or four-wire to two-wire conversion, which terminates the pair of telephone lines 350 with a complex impedance that matches with the pair of telephone lines 350 into the impedance. The hybrid function also extracts a communication signal from the telephone set 320 into the exchange, and transfers a communication signal from the PCM bus to the telephone sets 320 via the communications line.

A centralized ring generator 370 is connected to the pair of telephone lines 350 via a pair of normally-open switches 380. The centralized ring generator 370 includes a DC generator 370-1 that generates a −48 V DC signal, and an AC generator 370-2 that generates a 86 V rms signal. When an incoming call is made to one of the telephone sets 320, a command is sent to open the pair of normally closed switches 360, and to close the pair of normally open switches 380. This results in a ring signal being output from the centralized ring generator 370 to be sent via the MDF 330 to the telephone set 320 to which the incoming call is being sent.

Once the caller answers the telephone set 320 and thereby releases the switch hook of the telephone set 320, the pair of normally closed switches 360 return back to their closed state, and the pair of normally open switches 380 return back to their open state. This stops the ring signal generated by the centralized ring generator 370 from being sent to the telephone set 320, and also allows voice and/or data to be sent to and from the telephone set 320 to the calling location via the SLIC 310-1.

Due to the high amount of voltage required by the centralized ring generator 370 in simultaneously sending a ring signal over telephone lines in an office to various telephone sets, the ring signal cannot be readily sent over fiber optic lines or coaxial cable lines to the telephone sets without damaging the transmission media.

Consequently, there is a need for a ring circuit that operates with a SLIC that can accommodate the voltage specifications for an ISDN, fiber in the loop, or cable in the loop for ringing a plurality of telephone sets.

SUMMARY OF THE INVENTION

It is therefore an object of the invention to provide a high voltage ring signal inside a SLIC to provide an on-chip ring capability. The ring function is incorporated inside the SLIC, at low cost and wherein the on-chip ring generated SLIC can provide the ringing capability to individually and simultaneously drive a plurality of telephones at the same time. With this approach, a centralized ring generation circuit will not be required.

In accordance with this object, there is provided a ring generator circuit inside a SLIC connected to a plurality of telephone sets via telephone line pairs. The ring generator circuit receives a DC offset reference signal and an AC ring reference signal from external sources. The ring generator circuit includes an adder/divider circuit that receives the AC ring reference signal and the DC offset signal and outputs a fractionalized sum of the AC ring reference signal and the DC offset signal as a summed signal. The ring generator circuit also includes a full wave rectifier that receives the summed signal from the adder and outputs a rectified signal. Still further, the ring generator circuit includes a switch control circuit that receives the rectified signal from the adder and outputs a switch control signal based on the rectified signal. The ring generator circuit includes a first amplifier and a second amplifier that receive the rectified signal from the full wave rectifier and respectively have a first and a second predetermined gain, the first and second amplifier respectively outputting a first and second amplified signal. In addition, the ring generator circuit includes a switch having a first input connected to receive the first amplified signal, a second input that receives the second amplified signal, a switch control input that receives the switch control signal, and an output that outputs one of the first amplified signal and the second amplified signal as a ring signal based on a level of the switch control signal. The output of the switch is an unrectified signal that has either a reversed or the same polarity with respect to the summed signal. The unrectified signal is used to provide ringing for the telephone sets connected to the SLIC, and it is also fed back to an input port of the SLIC to form a negative feedback DC loop inside the SLIC.

Other objects, features, and advantages of the invention will be apparent to those of ordinary skill in the art from the following more detailed description.

BRIEF DESCRIPTION OF THE DRAWINGS

Exemplary embodiments of the invention are shown in the drawings, in which.

DETAILED DESCRIPTION OF THE PREFERRED EMBODIMENTS

The invention as described herein uses existing SLIC technology to generate a high voltage ring signal that can simultaneously drive a plurality of telephone sets. Briefly, the high voltage ring signal is formed by first summing a DC offset and a ring reference signal, rectifying the summed signal, amplifying the rectified summed signal, then unrec- tifying the amplified rectified summed signal via a commutator switch, which is sent to an output end of the DC loop as a ring signal and fed back to an input end of the DC loop.

The advantage of the instant approach is that both AC ring and DC offset can be generated simultaneously by the same circuit in the SLIC during the ringing state, while during the non-ringing state a normal DC feed is supplied to the telephone line.

According to a first embodiment of the invention, a commutator-switched ring generator is provided which generates an AC ring and a DC offset by modulating the DC loop inside the SLIC. In this first embodiment, both the DC and the low frequency AC signals are received externally or generated internally by the SLIC, either by hardware circuitry or by a software program. The DC loop gain is increased to lower the output impedance of the DC signal in order to make it appear similar to a standard voltage source.

Figure 4:
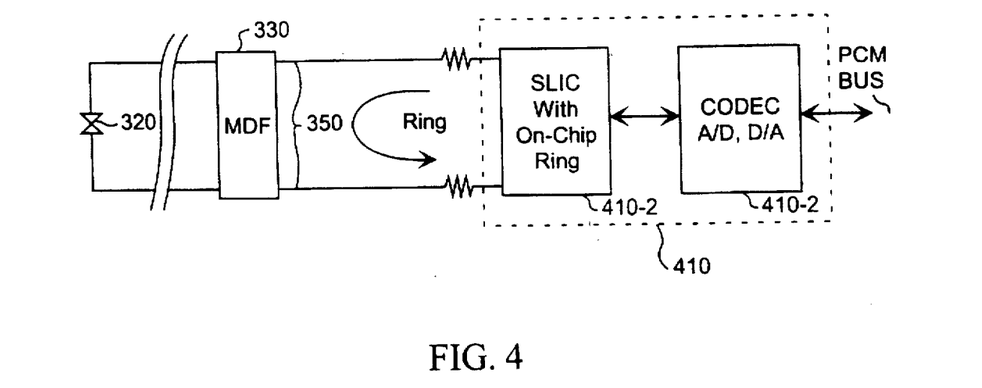
FIG. 4 shows the ring generator concept using an on-chip ring SLIC according to the invention.

A block diagram of the on-chip ring circuit incorporated into a SLIC is shown in FIG. 4. A line card 410 includes an on-chip ring SLIC 410-1 and a CODEC 410-2. The line card 410 is connected to a telephone line pair 350 and an MDF 330. The on-chip ring SLIC 410-1 provides a ring signal generated internally to the telephone sets upon notification of an incoming phone call to one or more of the telephone sets hooked up to the SLIC 410-1. In the configuration shown in FIG. 4, a centralized ring generator is not needed, thereby resulting in a more reliable, less costly system than what has previously been used in short loop environments. Since the centralized ring generator is no longer needed, this also eliminates the need for ring relays, ring feed resistors, and the like used with the central ring generator.

The invention as described herein uses existing SLIC bipolar technology to generate a high voltage ring signal that can simultaneously drive a plurality of telephone sets. This is done by amplifying a rectified ring reference signal consisting of both low frequency AC and DC components through a specific DC amplifier using a feedback loop. The amplified and rectified signal is then un-rectified through the use of a commutator switch to restore a correct ring signal which comprises both low frequency AC and DC offsets.

The ring signal actually consists of 2 parts, i.e., the high voltage AC for driving ringers and the DC offset for the ring/trip detection. While the central office grade ring signal can be as high as 100 VRMS AC superimposed on a −48 V DC, the local ring signal usually is less than 45 VRMS and 10 V DC due to a much shorter loop length (20 kft versus 500 ft maximum).

Figure 5:
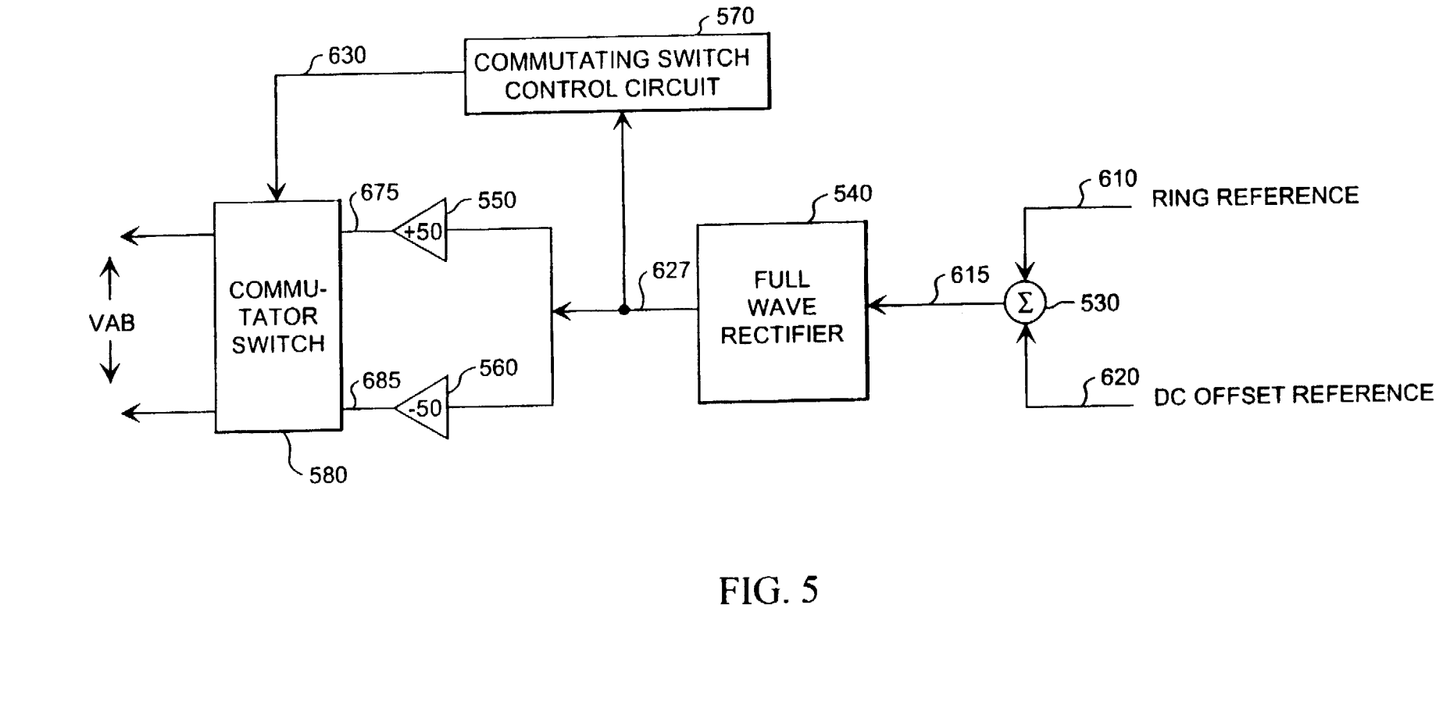
FIG. 5 shows the commutator switched ring generator principle according to the invention.

FIG. 5 explains the technique for generating a ring signal using a commutator switch according to the invention. First, a ring reference signal is generated. The ring reference signal represents a small scale version (usually about $\frac{1}{50}^{th}$) of the final ring signal VAB. Therefore, the ring reference signal is only a few volts or less.

In FIG. 5, a ring AC reference 610 and a DC offset reference 620 are supplied to an adder 530. The summed output 615 of the adder 530 is a low voltage AC signal with a DC offset, and this summed output 615 is input to a full wave rectifier 540. The full wave rectifier 540 outputs a full-wave rectified signal 627 to a pair of DC amplifiers 550, 560. In the preferred embodiment, the first amplifier 550 has a gain of +50, and the second amplifier 560 has a gain of −50. Of course, these amplifiers 550, 560 can have any particular gain associated them, and still be within the scope of the invention, as long as the absolute value of the gains of these two amplifiers 550, 560 are substantially the same, but with opposite polarity or sign. The respective waveforms of the signals 610, 615, 620, 627 are shown in FIG. 6.

Figure 6:
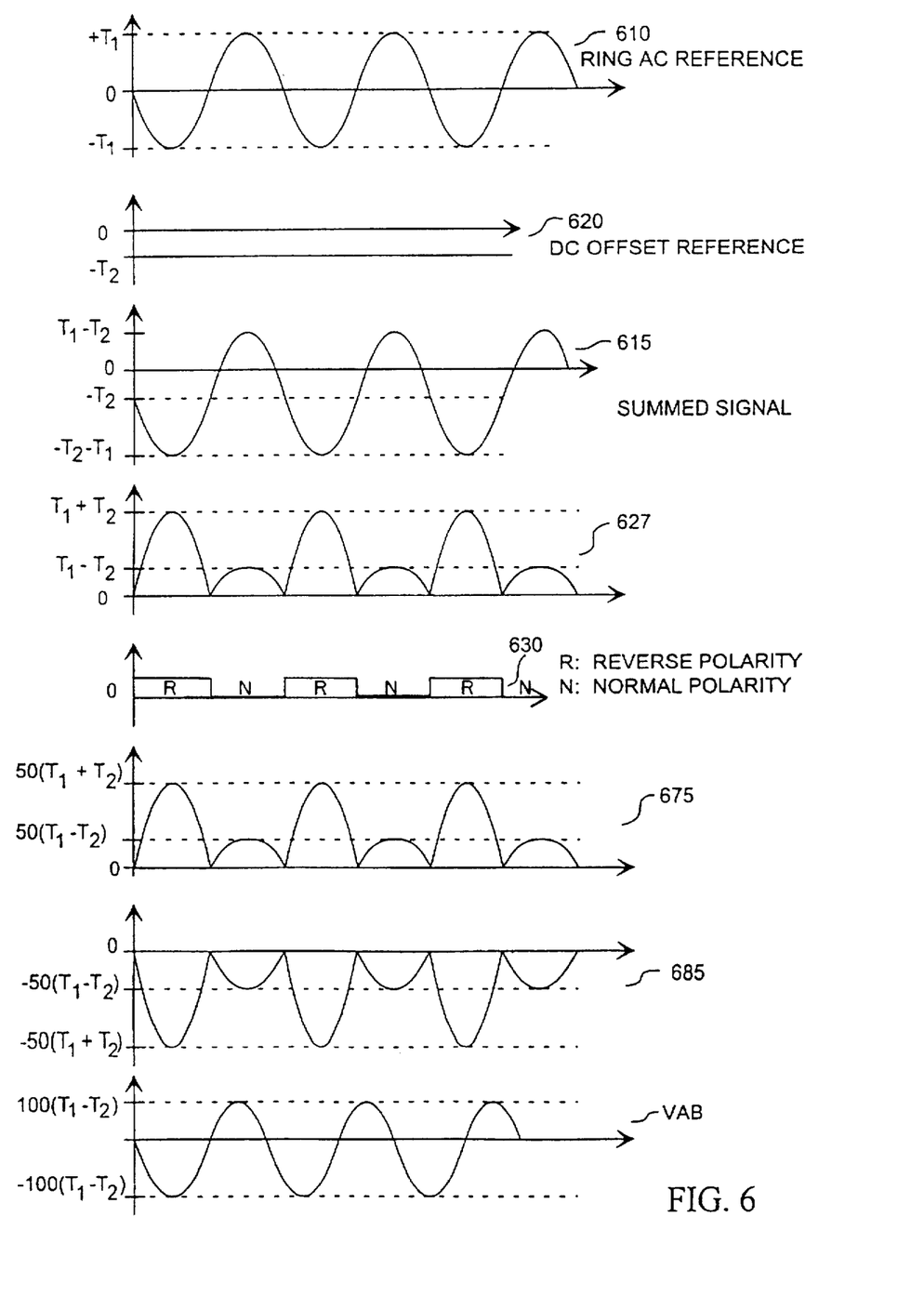
FIG. 6 shows the signal waveforms of the ring signals used in the DC loop of the SLIC according to the invention.

Referring now to FIG. 5 and FIG. 6, a commutation switch control circuit 570 receives the rectified output 627 from the full-wave rectifier 540, and uses that rectified output 627 to generate a commutation switch control signal 630 that is input to a commutation switch 580. The commutator switch control signal 630 is generated such that it is a logical '1' when the un-rectified signal 615 is less than 0 V, otherwise it is a logical '0'. The logical '1' and '0' values act to drive the commutator switch 580 respectively to a reverse state and to a normal state. Through this switching action, the rectified and amplified output signals 675, 685 of the first and second amplifiers 550, 560, will be un-rectified and restored to the desirable output ring waveform VAB as shown in FIG. 6. In other words, the commutator switch or polarity reverser 580 is employed to reverse the polarity of the full-wave rectified signal 627 at the proper instants in time in order to generate an AC ring signal superimposed on a DC offset.

It also should be noted that the full-wave rectified signal 627 and the commutator switch control signal 630 can be generated either by the hardware means as described above, or by software means through a digital pattern generator, or the like.

The invention as described herein uses the DC amplification of the SLIC as a base, and then combines that with commutator switch control as described above to form a ring generator.

The conventional technique to provide DC to a telephone set uses a –48 V DC and a pair of feed resistors to generate a loop current. A typical feed for a central office line card is –48 V, 2×200 ohm, while other values are possible. The semiconductor-based SLIC, on the other hand, has a DC current amplifier at the front end followed by a negative feedback in order to reduce the output resistance from a very high value to approximately 2×200 ohm. In other words, a current amplifier and a feedback loop make the SLIC appear like a voltage of –48 V in series with two 200 ohm resistances.

Figure 7:
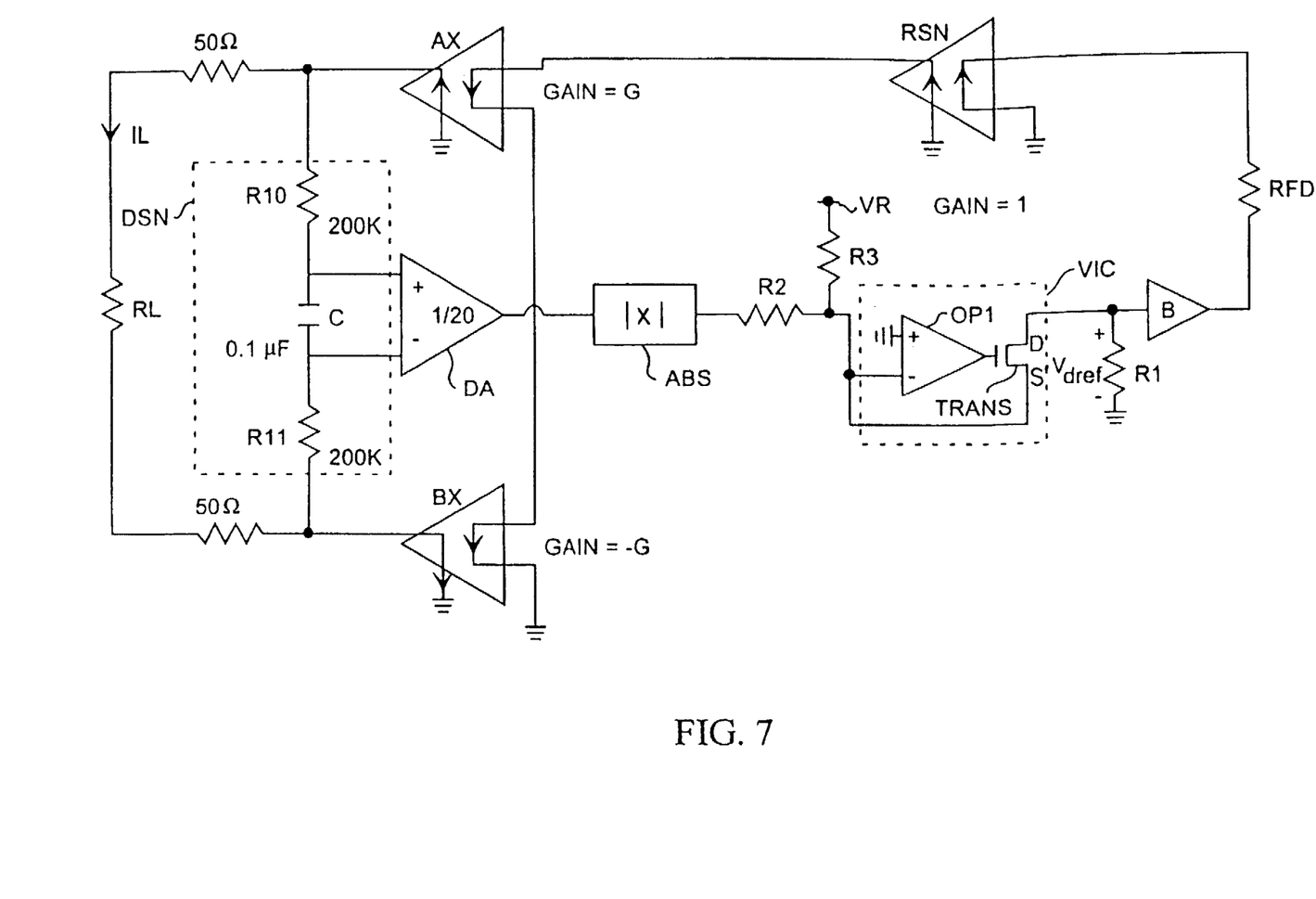
FIG. 7 shows the DC feedback loop of the SLIC.

FIG. 7 shows the DC loop control of the SLIC according to the invention. There are two output current amplifiers AX and BX which supply current to a load RL. The load RL corresponds to one or more telephone sets connected to the SLIC via the telephone lines, shown in FIG. 7 as 50 ohms, acting as a protection resistance. The voltage across the two 50 ohm line resistances and RL is detected through a voltage sensing network DSN, which consists of two 200 k resistors R10 and R11, and one 0.1 uf capacitor C. This sensing network of resistors R10, R11, and capacitor C acts as a low pass filter to filter out high frequency AC signals, like speech, from entering the DC loop of the SLIC.

The DC voltage across the capacitor C is then fed to a differential amplifier DA, which in the preferred embodiment has a gain of 1/20. Subsequently, the reduced sensed voltage output from the differential amplifier DA passes through an "absolute value" circuit ABS, which in the preferred embodiment is a full-wave rectifier. The purpose of the absolute value circuit ABS is to maintain a positive output voltage regardless of the polarity of the sensed voltage.

The rectified DC sensed voltage that is output from the full-wave rectifier ABS is then summed with a reference voltage –VR through a voltage-to-current converter VIC having an operational amplifier OP1 and an output buffer transistor TRANS. The resultant current then flows through a resistor R1 to develop a voltage drop $V_{drop}$, which in turn generates a current equal to the voltage drop $V_{drop}$ divided by resistance RFD through a buffer amplifier B, and then to a unity gain current amplifier RSN, where the polarity is reversed. The output current of amplifier RSN is then fed to a pair of current amplifiers AX and BX, both of which have gains of equal magnitude, but with opposite polarity (i.e., +G, –G). The output of amplifier RSN flows through both amplifiers AX and BX. The output current from amplifiers AX and BX then flows through load RL again, thereby forming a feedback loop.

Figure 8:
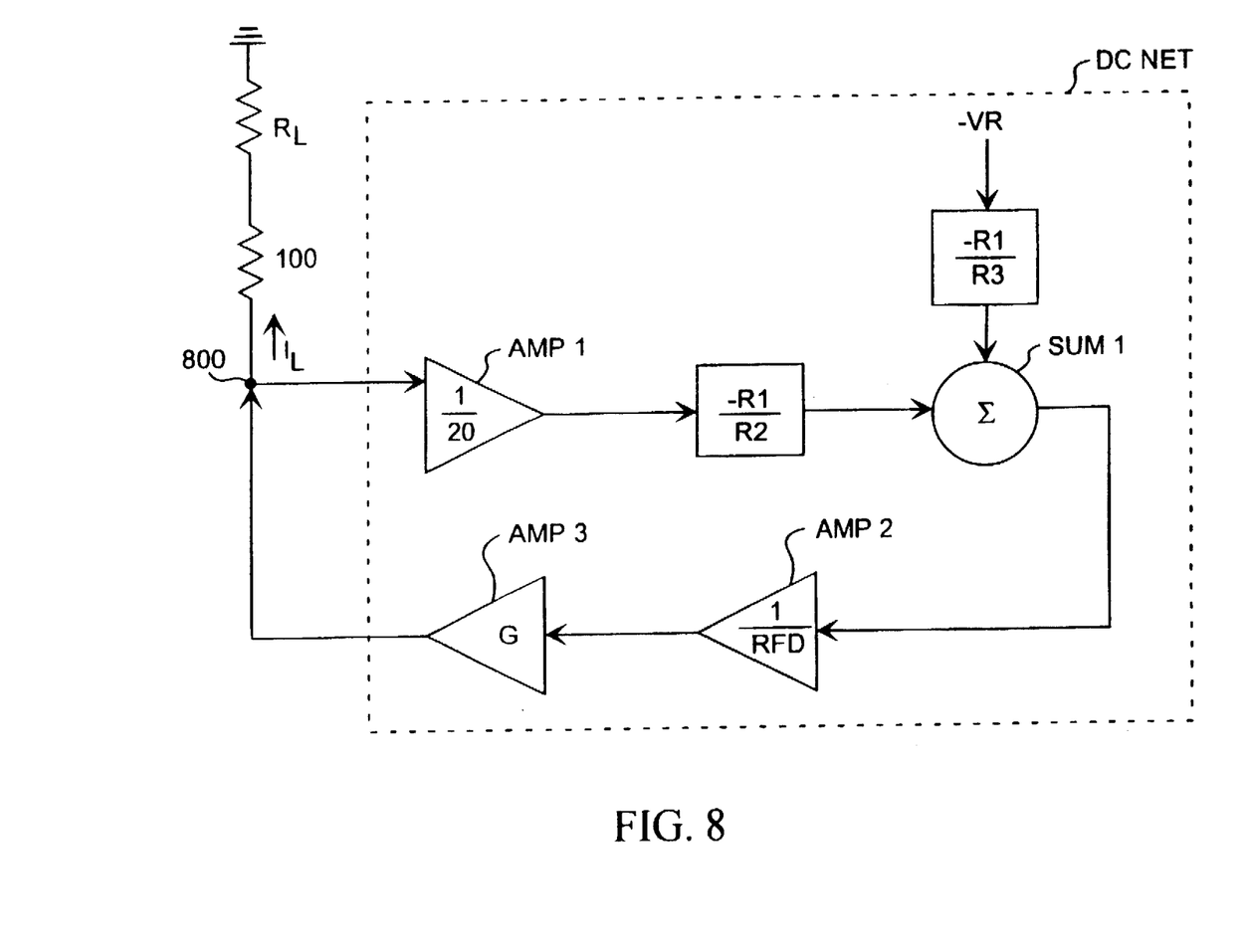
FIG. 8 shows a conventional equivalent circuit of a DC loop synthesis.

An equivalent circuit of the above-mentioned DC loop is shown in FIG. 8. A telephone set is connected to the control loop DCNET via a telephone line with a load resistance RL. DCNET comprises a first amplifier AMP1 with a gain of 1/20, a first gain circuit –R1/R2, a summation point SUM1, a second gain circuit –R1/R3, a second amplifier AMP2 with a gain of 1/RFD, and a third amplifier AMP3 with a gain of G. DCNET feeds back to a node 800, which is connected directly to the telephone line with a 100 ohm equivalent resistance. The DC loop of the SLIC, as shown in FIG. 8, is functionally equivalent to FIG. 7. The equivalence of the DC loop of the SLIC as given in FIG. 8 is shown as follows:

$$\frac{\left(\frac{I_L \cdot (R_L + 2 \times 50)}{20}\right) \cdot \left(-\frac{R_1}{R_2}\right) + VR \cdot \frac{R_1}{R_3}) \cdot G}{RFD} = I_L$$

$$\therefore I_L = \frac{VR \cdot 20 \cdot \frac{R_2}{R_3}}{R_L + 100 + \frac{RFD}{G} \cdot \frac{R_2}{R_1} \cdot 20}$$

Assume $R1 = R2 = R3 = 10K$, $VR = 2.5V$, $G = 1000$, $RFD = 15K$

Then, $$I_L = \frac{50}{R_L + 100 + 300} = \frac{50}{R_L + 2 \times 200}$$

The above calculation shows that a 50 V, 2×200 ohm DC feed characteristic can be synthesized with a proper negative feedback condition in the SLIC. As can be seen from the above equations and from FIG. 7, the effective gain of the DC feedback loop equals 50/(–VR)=50/(–2.5)=–20. Other values of gain are possible as long as the desirable output voltage does not exceed the supply voltage.

This invention integrates the above-described DC loop synthesis with commutator switch control to generate the ring signal. The rectified ring reference signal is first amplified by the DC loop and then un-rectified using the commutator switch to reverse the polarity at proper time intervals. The ring reference signal needs to be rectified to one polarity due to the fact that the DC loop can only work properly with a DC or DC-like signal.

Figure 9:
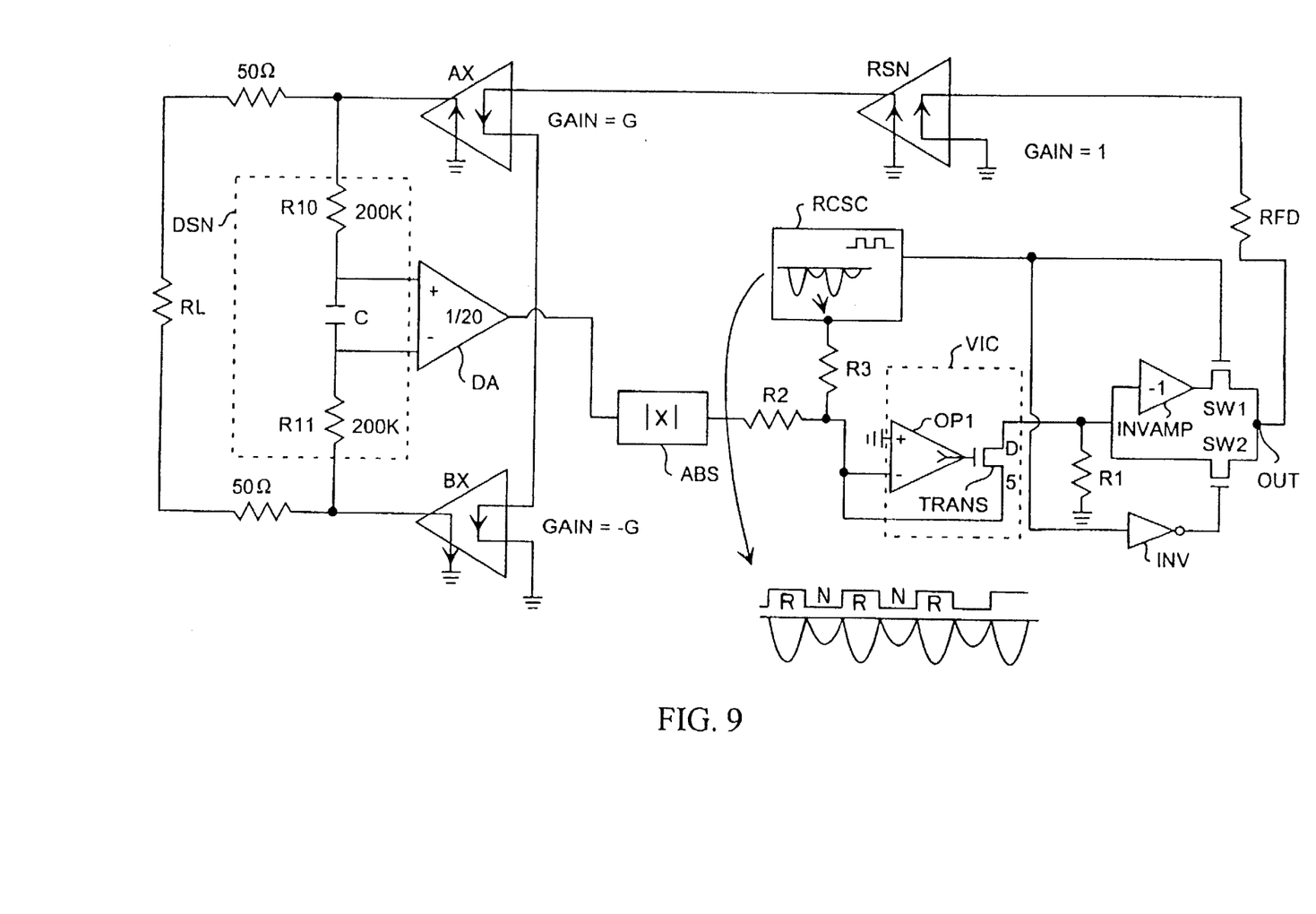
FIG. 9 shows the on-chip ring SLIC according to the invention.

An embodiment of the invention is shown in FIG. 9. The circuit of the ring generator shown in FIG. 9 is similar to that shown in FIG. 7, except that the voltage reference –VR is replaced by the reference and commutator switch control circuit RCSC, and a pair of polarity reverse switches sw1 and sw2 are added at the output of the voltage-to-current converter VIC. Also, an inverter INV is added between RCSC and the switch sw2, in order to send a reverse polarity signal to the switch sw2 with respect to the signal sent to switch sw1.

In this embodiment, the rectified ring reference signal that is output from the rectifier ABS is amplified by a ratio directly related to R1/R2. Note that the ring reference signal is a very low frequency signal, and therefore it is still within the operation range of the DC control loop.

The commutator switch control signal that is output from the reference and commutator switch control circuit RCSC, as shown in FIG. 9, will be in synchronization with the ring reference signal for controlling the commutator switches sw1 and sw2. A logical '0' will turn "off" sw1 and turn "on" sw2, while a logical '1' will turn "on" sw1 and turn "off" sw2. For a normal polarity, sw2 will be "on", while for a reverse polarity, sw1 will be "on" due to an inverting gate INV connected to the input to switch sw2. The inverting gate INV has unity gain. By controlling the switches sw1, sw2, an amplified ring signal with both AC and DC components restored will be generated at the common output OUT of the switches sw1, sw2, as shown in FIG. 9. In the preferred embodiment, switches sw1 and sw2 are p-type j-FETs, but they can be any type of switching device and still be within the scope of the invention.

The combination of the switches sw1 and sw2 as shown in FIG. 9 perform the function of the commutator switch 580 as shown in FIG. 5 to unrectify and restore the ring signal. The switches sw1 and sw2 have similar input/output characteristics, thereby ensuring that their outputs have substantially the same magnitude.

Figure 10:
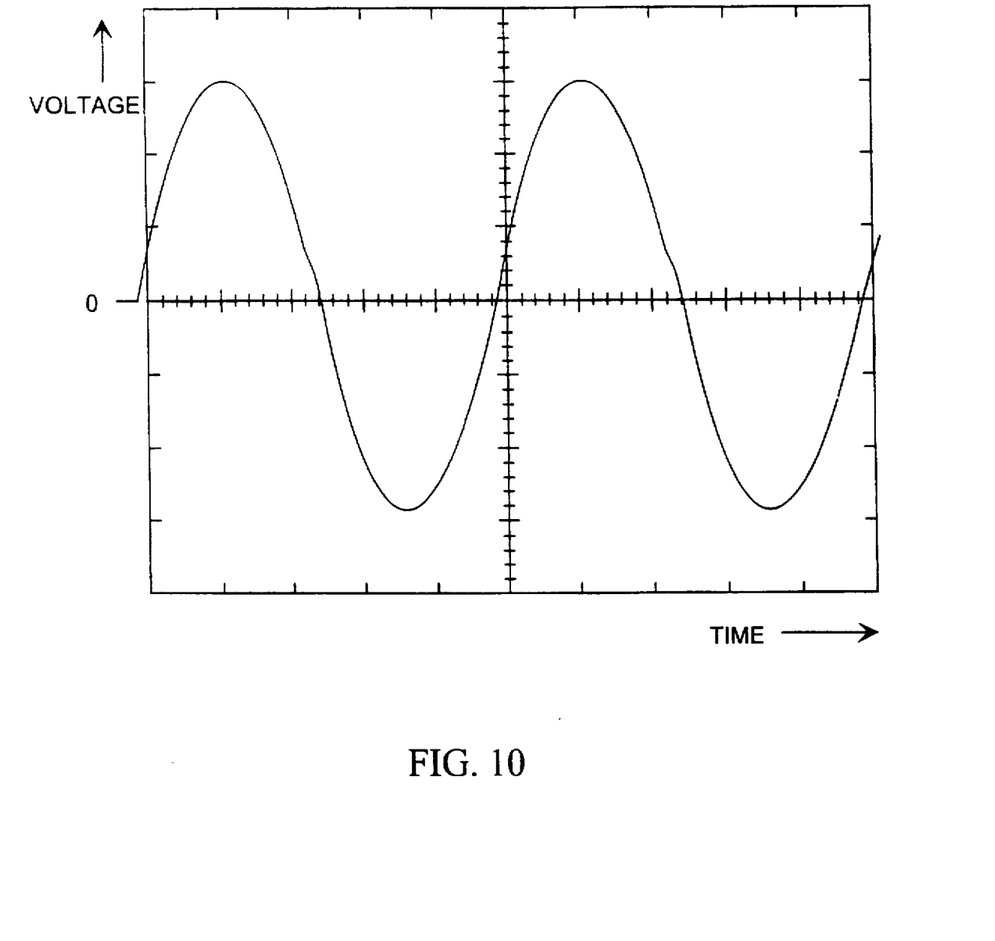
FIG. 10 shows experimental results for a continuous ring output signal according to the invention with a 7 kohm resistive load connected to the SLIC.
Figure 11:
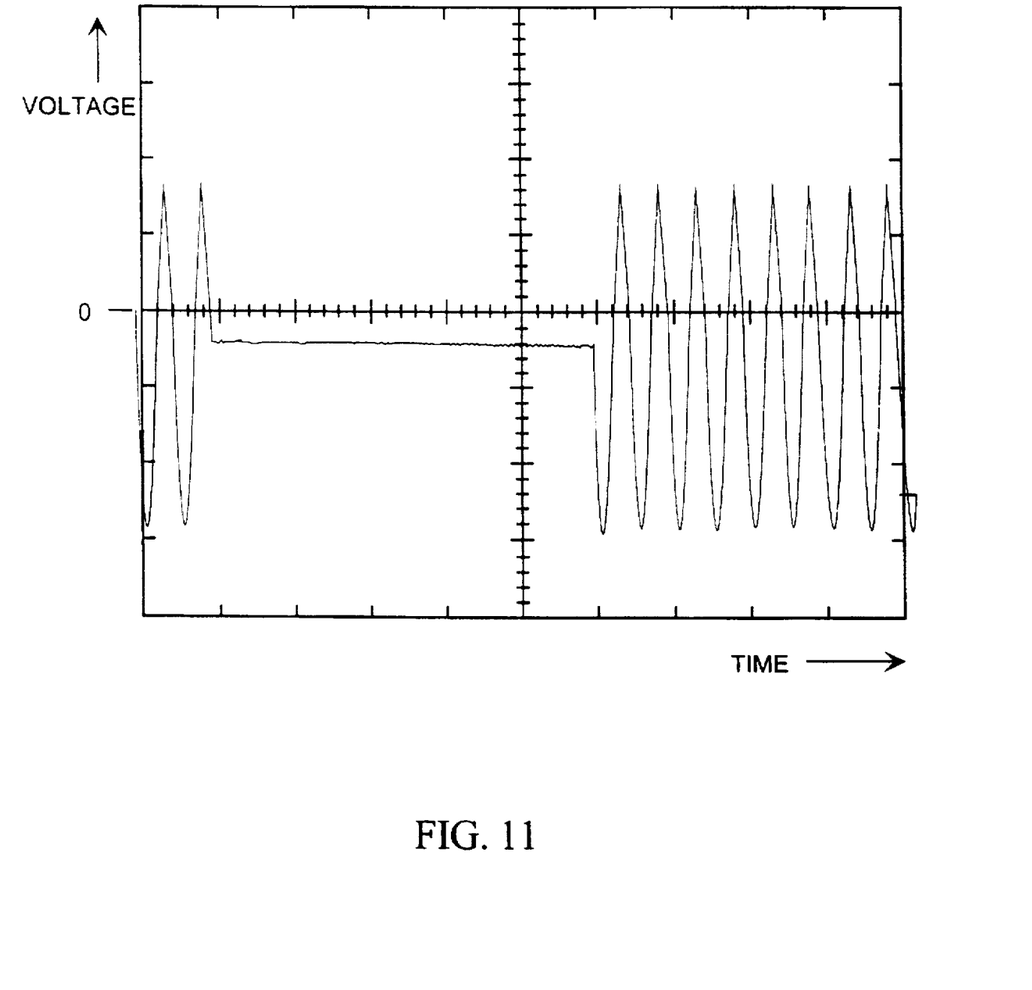
FIG. 11 shows experimental results for a cadence ring output signal according to the invention with a 7 kohm resistive load connected to the SLIC.

The maximum ring generator output is limited by the battery supply voltage to the AX and BX amplifiers, even though the amplifier gain can be set to any value. FIG. 10 and 11 show the results of test data applied to the circuit of the invention, with the amplifier gain set to 50 and the AC ring reference and DC offset reference set to 2 Vp-p and −0.2 V, respectively. The resulting voltage vs time output ring signals are based on a battery voltage of 70 V, while a higher battery voltage will increase the maximum ring output voltage. FIG. 10 shows the continuous ring output for the on-chip ringing SLIC according to the invention, and FIG. 11 shows the cadence ring output for the on-chip ringing SLIC according to the invention. In both of these cases, the output of the SLIC was to a 7 kohm resistive load, which corresponds to about one telephone set.

While preferred embodiments of the invention has been described herein, modification of the described embodiments may become apparent to those of ordinary skill in the art, following the teachings of the invention, without departing from the scope of the invention as set forth in the appended claims.

What is claimed is:

1. A subscriber line interface circuit (SLIC) having an internal DC loop including a ring generator circuit, said SLIC having a pair of ports connected to a plurality of telephone sets through a plurality of telephone line pairs, said SLIC comprising:

summing means for receiving an AC ring reference signal and a DC offset signal and for outputting a fractionalized sum of said AC ring reference signal and said DC offset signal as a summed signal;

a full wave rectifier connected to receive said summed signal from said summing means and outputting a rectified signal;

a switch control circuit connected to receive said rectified signal from said full wave rectifier and outputting a switch control signal based solely on said rectified signal;

a first amplifier connected to receive said rectified signal from said full wave rectifier and having a first predetermined gain, said first amplifier outputting a first amplified signal;

a second amplifier connected to receive said rectified signal from said full wave rectifier and having a second predetermined gain, said second amplifier outputting a second amplified signal; and a switch having a first input connected to receive said first amplified signal, a second input connected to receive said second amplified signal, a switch control input connected to receive said switch control signal, and an output for outputting one of said first amplified signal and said second amplified signal as a ring signal based on a level of said switch control signal, wherein said switch control signal has one of a first and a second state as a current state, and said switch control signal changes said current state each time that said rectified signal is detected as being at zero magnitude.

2. The subscriber line interface circuit according to claim 1, wherein said first predetermined gain has a first magnitude and a first sign, said second predetermined gain has a second magnitude and a second sign, and said first and second magnitudes are equal to each other, and said first and second signs are not equal to each other.

3. The subscriber line interface circuit according to claim 1, wherein said switch is a commutator switch.

4. The subscriber line interface circuit according to claim 1, wherein said switch control signal is at one of a first and a second predetermined level, said first predetermined level being output when said summed signal has a same sign as said rectified signal, and said second predetermined level being output when said summed signal has an opposite sign as said rectified signal.

5. The subscriber line interface circuit according to claim 1, further comprising a DC sensing network connected to said summing means.

6. The subscriber line interface circuit according to claim 1, wherein said DC offset signal and said AC ring reference signal are generated within said SLIC by a software pattern generator.

7. The subscriber line interface circuit according to claim 1, wherein said DC offset signal and said AC ring reference signal are supplied to said SLIC by an external signal source.

8. The subscriber line interface circuit according to claim 1, further comprising a voltage divider circuit connected between said first and second amplifiers and said switch.

9. The subscriber line interface circuit according to claim 1, wherein said switch comprises:

a first field effect transistor having a gate connected to receive said switch control signal, a source connected to receive said first amplified signal, and a drain;

an inverter connected to receive said switch control signal and output an inverted switch control signal; and a second field effect transistor having a gate connected to said inverted switch control signal from said inverter, a source connected to receive said second amplified signal, and a drain, wherein said drains of said first and second p-type field effect transistors are connected together to form said output of said switch.

10. The subscriber line interface circuit according to claim 2, wherein said first amplified signal is a full-wave rectified positive signal, and said second amplified signal is a full-wave rectified negative signal.

11. The subscriber line interface circuit according to claim 9, further comprising:

a resistor having a first end connected to the drains of said first and second p-type field effect transistors, said resistor having a second end; and a third amplifier connected between the second end of said resistor and said summing means.

12. The subscriber line interface circuit according to claim 8, wherein said voltage divider circuit comprises:

a operational amplifier having a non-inverting input connected to receive a ground voltage. having an inverting input connected to the output of said summing means and the output of said switch control circuit, and having an output; and a field effect transistor having a gate connected to the output of said operational amplifier, having a source connected to the inverting input of said operational amplifier, and having a drain connected to said switch.

13. A method of creating a ring signal internal to a subscriber line interface circuit (SLIC) which can simultaneously drive a plurality of ringers connected to said SLIC, comprising the steps of:

a) receiving an externally-supplied AC ring reference signal and DC offset signal;

b) adding a predetermined fraction of said AC ring reference signal and said DC offset signal to form a summed signal;

c) rectifying said summed signal to form a rectified signal;

d) creating a switch signal based solely on said rectified signal, wherein said switch signal is in a first state when said rectified signal has reached zero magnitude an even number of times, and said switch signal is in a second state when said rectified signal has reached zero magnitude an odd number of times;

e) applying first and second amplifications to said rectified signal to respectively form first and second amplified signals, wherein said second amplification is of a same magnitude and of an opposite sign as said first amplification; and f) switching one of said first and second amplified signals to an output port based on whether said switch signal is in said first state or said second state, wherein a ring signal is formed on said output port of said SLIC as a result thereof.

14. The method according to claim 13, further comprising the step of:

g) applying said switched output from the step f) to an input port of said SLIC, thereby forming a negative feedback DC loop.

15. The method according to claim 13, wherein said predetermined fraction is about 1/20.

16. A subscriber line interface circuit (SLIC) connected to a plurality of telephone sets via respective telephone line pairs, said SLIC including a ring generator circuit for creating a ring signal to be sent to said one of said plurality of telephone sets upon occurrence of an incoming telephone call to said one of said plurality of telephone sets, said SLIC comprising:

means for receiving an externally-supplied ring reference signal and DC offset signal;

means for adding a predetermined fraction of said ring reference signal and said DC offset signal to form a summed signal;

means for rectifying said summed signal as a rectified signal;

means for creating a switched signal based solely on said rectified signal, wherein said switched signal is in a first state when said rectified signal has reached zero magnitude an even number of times, and said switched signal is in a second state when said rectified signal has reached zero magnitude an odd number of times; and means for separately amplifying said rectified signal by a first magnitude at a first polarity as a first amplified signal, and at said first magnitude at a second polarity opposite from said first polarity as a second amplified signal, and for outputting one of said first and second amplified signals based on whether said switched signal is in said first state or said second state.

17. A subscriber line interface circuit (SLIC), comprising:

an adder receiving a first signal and a second signal and outputting a fractionalized sum of said first and second signals as a third signal;

a filter receiving said third signal and outputting a fourth signal, said fourth signal having a same magnitude and a same polarity as said third signal when said third signal is positive, said fourth signal having a same magnitude and an opposite polarity as said third signal when said third signal is negative;

a switch control circuit receiving said fourth signal and outputting a fifth signal based solely on times when said fourth signal is at zero magnitude; and a switch receiving said fourth signal and said fifth signal, and outputting one of said fourth signal and an inverted fourth signal as a ring signal based on said fifth signal, wherein said inverted fourth signal has a same magnitude and an opposite sign as said fourth signal.

18. The subscriber line interface circuit according to claim 17, wherein said fifth signal is at one of a first and a second predetermined level, said first predetermined level being output when said third signal has a same sign as said fourth signal, and said second predetermined level being output when said third signal has an opposite sign as said fourth signal.

19. The subscriber line interface circuit according to claim 17, wherein said fifth signal has one of a first and a second state as a current state, and said fifth signal changes said current state every time said fourth signal is detected as having less than a predetermined magnitude.

* * * * *